United States Patent [19]

Nakagawa

[11] Patent Number: 5,117,411
[45] Date of Patent: May 26, 1992

[54] LENS CLEANER FOR A COMPACT DISK PLAYER

[76] Inventor: Hiromu Nakagawa, 1-27-601, Uehonmachi 2-chome, Tennohjiku, Osaka, Japan

[21] Appl. No.: 488,219

[22] Filed: Mar. 5, 1990

[30] Foreign Application Priority Data

Mar. 3, 1989 [JP] Japan .................................. 1-52672

[51] Int. Cl.$^5$ .............................................. G11B 7/12
[52] U.S. Cl. ...................................... 369/72; 369/71; 369/292; 15/DIG. 2
[58] Field of Search ................. 360/128, 137; 369/71, 369/72, 292, 73; 15/248, 246

[56] References Cited

U.S. PATENT DOCUMENTS

| 4,628,388 | 12/1986 | Kawabe | 15/246 |
| 4,817,078 | 3/1989 | Iwata | 369/71 |
| 4,870,636 | 9/1989 | Yamamoto | 369/71 |

FOREIGN PATENT DOCUMENTS

| 0020786 | 1/1988 | Japan | 369/71 |
| 0136371 | 6/1988 | Japan | 369/72 |
| 0313378 | 12/1988 | Japan | 369/72 |
| 0109582 | 4/1989 | Japan | 369/292 |
| 1574383 | 9/1980 | United Kingdom | 369/72 |

OTHER PUBLICATIONS

Crutchfield, Spring 89, p. 20.

Primary Examiner—Stuart S. Levy
Assistant Examiner—Tan Nguyen
Attorney, Agent, or Firm—Evenson, Wands, Edwards, Lenahan & McKeown

[57] ABSTRACT

A lens cleaner in the form of a disk provided on a compact disk (CD) player using a method for cleaning a pick-up lend of the CD player. Some brushing hair bundles have substantially the same shape as the disk and comprise a plurality of brushing hair bundles planted on a surface of the disk so as to disperse in the circumferential direction and the radial direction. Even though these hair bundles are brought into contact with the pick-up lens, the rotational capacity of the disk is not deteriorated so that the lens surface is not damaged and the lens can be effectively cleaned.

10 Claims, 3 Drawing Sheets

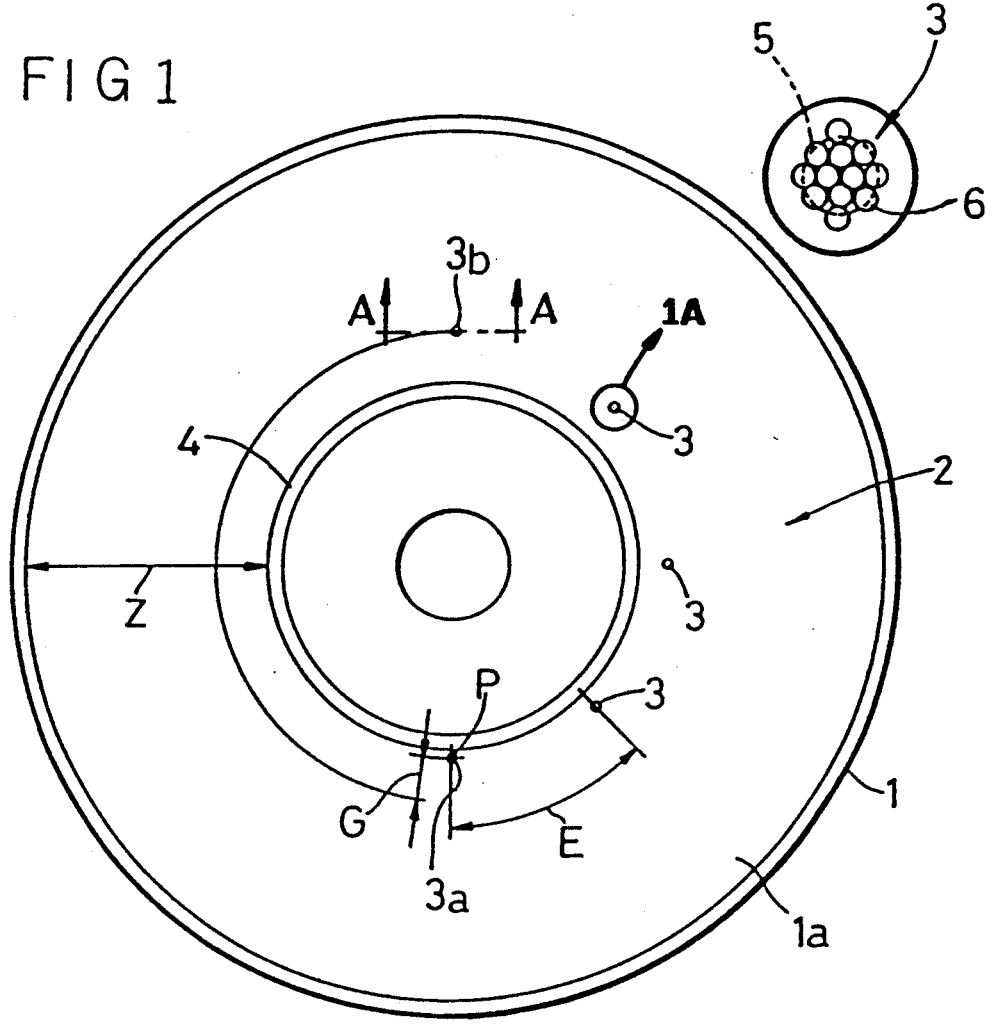
FIG 1
FIG 1A
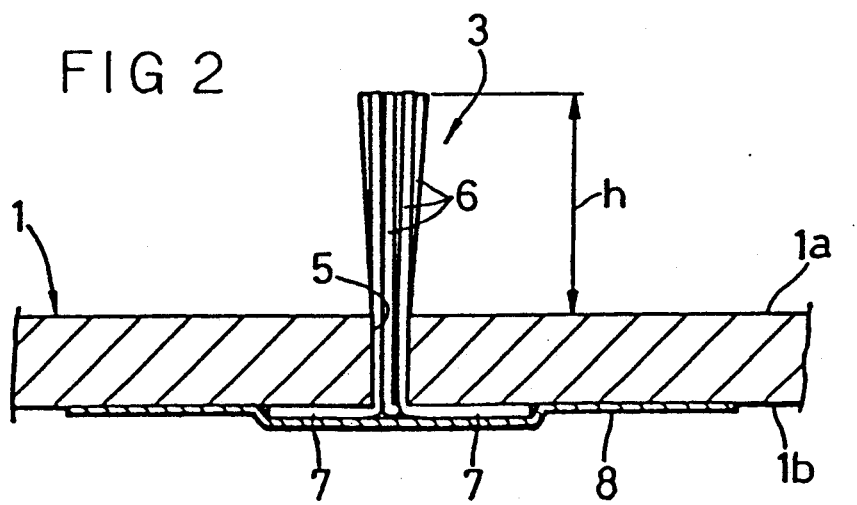
FIG 2

LENS CLEANER FOR A COMPACT DISK PLAYER

BACKGROUND AND SUMMARY OF THE INVENTION

The present invention relates to a lens cleaner capable of being mounted on a compact disk player (hereinafter referred to as a CD player) and a method for cleaning a pick-up lens on a side of the player.

In a conventional CD player, a recording signal is read through an optical lens just opposite to the compact disk. If foreign matter, such a floating dust in the air and textile wastes, adheres to the surface of this optical pick-up lens, an error can occur in the reading of the signal with resultant deteriorations of the regeneration characteristics.

In an attempt to solve such a problem and to clean the pick-up lens, lens cleaners having substantially the same shape as the compact disk have been proposed as disclosed in Japanese Patent Application Laid-Open No. Sho 60-40,537 and Japanese Utility Model Application Laid-Open No. Sho 62-57,931.

Such conventional lens cleaners comprise long cleaning members formed of an assembly of a large number of brushing hairs fixedly mounted on the surface of a disk across a lead-in area in the radial direction. Also the lens cleaner currently available on the market have cleaning members formed of an assembly of a series of radially long brushing hairs projecting from the surfaces of a disk by about 3 mm, a circumferential width of 2 to 4 mm and a radial length of 6 to 10 mm and projected from the surface of the disk by about 3 mm. Also, a series of triangular cloths have been used as cleaning members.

In such conventional lens cleaners, however, a series of cleaning members are densely arranged at one place or at most two opposite places so that they stride over or straddles the lead-in area. As a result, the area of one cleaning member is too large, and the cleaning members themselves act as obstacles. Accordingly, when the pick-up lens is focused with movement toward the compact lens and the surface of the lens is brought into contact with the brushes, a protective circuit on the side of the CD player for avoiding the obstacle is operated to stop the rotation of the cleaner. Consequently, the cleaning cannot be carried out under such circumstances. Furthermore, it frequently happens that the lens cleaner is stopped after only one rotation.

In addition, because a series of cleaning members formed of brushing hairs and the like are simultaneously rubbed against the surface of the lens to remove foreign matter, the coating layer on the surface of the lens is apt to be damaged and substantially reduce the signal-to-noise (S/N) ratio of the pick-up system. Furthermore, depending on the type of CD player, the player can be interrupted by the contact resistance with the cleaning member.

Thus, it is an object of the present invention to provide a lens cleaner capable of preventing a poor cleaning action from occurring when cleaning members are brought into contact with a pick-up lens on the side of a CD player.

It is another object of the present invention to provide a lens cleaner capable of preventing the pickup lens on the side of the CD player from being damaged and to increase the cleaning capacity.

It is a further object of the present invention to provide a lens cleaner wherein bundles of brushing hairs can be easily planted on a surface of the disk.

The foregoing objects have been achieved in accordance with the present invention by finely dividing the cleaning members to such an extent that the focusing action of the pick-up lens and the rotary action of the disk are not hindered and some of the respective unit cleaning members are less densely arranged on the surface of the disk under the condition that they are movable in the circumferential direction and the radial direction.

BRIEF DESCRIPTION OF THE DRAWINGS

These and other features, objects and advantages of the present invention will become more apparent from the following detailed description of several presently preferred embodiments when taken in conjunction with the accompanying drawings wherein:

FIG. 1 is a plan view of a cleaning member disk in accordance with one embodiment of the present invention;

FIG. 2 is an enlarged sectional view taken along line A—A of FIG. 1;

DETAILED DESCRIPTION OF SEVERAL PRESENTLY PREFERRED EMBODIMENTS

Figure 3:
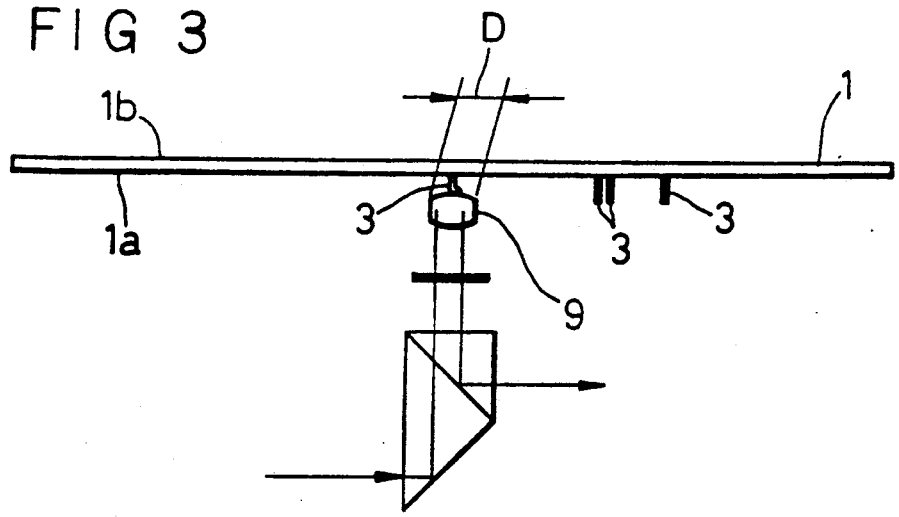
FIG. 3 is an operational diagram showing the lens cleaner in relation to the pick-up lens.

Referring now to the drawings and, in particular, to FIG. 1, there is shown a main body of lens cleaner in accordance with my invention in the form of a disk 1 having, as shown in FIG. 2, a signal-recording side 1a and a label side 1b and a shape substantially the same as a compact disk.

The cleaning member 2 is divided into five brushing hair bundles 3, 3a and 3b comprising about ten pieces of ultrafine brushing hair 6 made up in a bundle as shown in the magnified area in FIG. 1. The brushing hair bundles 3, 3a and 3b are separated in the circumferential direction and in the radial direction, respectively, in an outer circumferential areas Z (the original signal-recording area) adjacent to an outer periphery of a lead-in area 4 on a signal-recording side 1a of the disk 1. It is not required, however, that signals are actually recorded over the entire outer circumferential area Z.

Dispersion centers are set so that a phase may be shifted by 45° counterclockwise with one point 1 mm out of an outer edge of the lead-in area 4 as an imaginary fundamental point P and a shift may brought about by 1.5 mm in the radial direction from a circle passing through the imaginary fundamental point P radially outwardly at every phase shift with the respective brushing hair bundles 3 being arranged at the respective dispersion centers. In other words, the respective brushing hair bundles 3 are spirally arranged on the disk 1.

By arranging the brushing hair bundles 3 in the above described manner, an interval E between the adjacent brushing hair bundles 3 and 3a in the circumferential direction is set so as to be sufficiently larger than a diameter D of a pick-up lens 9 (FIG. 3). In addition, since an interval between the adjacent brushing hair bundles 3, 3 in the radial direction is 1.5 mm, an interval G between a brushing hair bundle 3a positioned on the innermost side of the disk 1 and a brushing hair bundle 3b positioned on the outermost side of the disk 1 in the radial direction amounts to 6 mm or the same as the pick-up lens diameter D.

FIG. 2 shows one way of planting or anchoring the brushing hair bundles 3 to the disk 1. The disk 1 is provided with through-holes 5 having a diameter of 0.5 mm formed at the diffusion centers. Base end portions 7 of the brushing hair bundles 3 comprising about ten pieces of ultrafine brushing hair 6 are inserted through the through-holes 5 from the signal-recording side 1a and are bent radially around a circumferential edge portion surrounding the through-hole 5 to be fixedly adhered to the disk 1 by adhesive tape 8 or other suitable techniques. The brushing hairs 6 are formed, for example, of natural and synthetic threads, monofilaments, feathers, fibers and the like and their projecting height is set at 3 mm from the signal-recording side 1a.

Dummy signals for continuing the rotation of a driving shaft of the disk 1 are recorded on the lead-in area 4 of the disk 1, and few signals are recorded on the outer circumferential area Z.

The lens cleaner having the above described construction carries out the cleaning operations under the condition that the signal-recording side 1a is correctly opposite to the pick-up lens 9 as shown in FIG. 3. Upon setting the disk 1 in the CD player and actuating a button on the side of the player, the pick-up lens 9 is shifted to a starting position just opposite to the lead-in area 4 and simultaneously the disk 1 is rotatively driven to carry out the focusing action of the pick-up lens 9. During this time, there is the possibility that the brushing hair bundle 3a positioned on the innermost side is brought into contact with the pick-up lens 9 or a lens holder, but the brushing hairs 6 comprising the brushing hair bundle 3a are easily deformed since deformation resistance is very small. Accordingly, the protective circuit of the CD player is not operated and the focusing action of the pick-up lens 9 is satisfactorily conducted so that the dummy signals recorded in the lead-in area 4 are continuously read.

The dummy signals have the contents that, for example, a first music (or a file aimed) is started from a central position of the brushing hair bundle 3 positioned centrally in the circumferential direction, and the pick-up lens 9 is rapidly shifted to a position just opposite to a signal track passing through the center of the brushing hair bundle 3 with the disk 1 being rotated at about 600 rpm. In other words, the signal track passes through a center of the pick-up lens 9 in the circumferential direction in 1/10 of a second, and the respective brushing hair bundles 3 are, in turn, brought into contact with a surface of the lens 9 to carry out the cleaning operations. In this time interval, five brushing hair bundles 3 are brought into contact with the surface of the lens sequentially so that the rotating resistance which the disk 1 encounters is very small. Accordingly, even in the case where the rotational torque is small, continued rotation can be assured.

Figure 4:
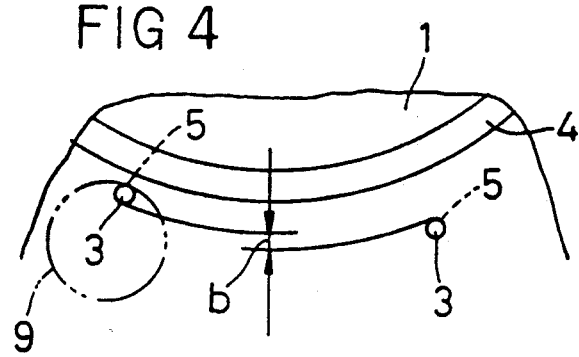
FIG. 4 is a diagram showing a dimensional relation of adjacent brushing hair bundles.

Upon shifting the pick-up lens 9 from the cleaning-starting position by 1 mm in the radial direction, the entire surface of the lens 9 is cleaned by the brushing hair bundles 3, 3a and 3b. In short, the interval between the centers of the adjacent brushing hair bundles 3, 3 in the radial direction is 1.5 mm, as above described, but the diameter of the respective brushing hair bundles 3 is 0.5 mm, so that a minimum net interval b (FIG. 4) between the adjacent brushing hair bundles 3, 3 in the radial direction is 1.0 mm. Thus, upon shifting the pick-up lens 9 by 1 mm, the whole surface of the lens can be cleaned. The pick-up lens 9 then stops the tracking movement to return to the watch-and-wait condition.

Subsequently, upon switching-on an eject button on the side of the player, the disk 1 is taken out of the player. If necessary, the play button can be switched on again or a repeat button is switched on to conduct the cleaning.

Since the cleaning member 2 comprises a plurality of brushing hair bundles 3 diffused on the surface of the disk 1, it is possible now to prevent all of the brushing hair bundles 3 from being simultaneously brought into contact with the pick-up lens 9 and to avoid any hindrance to the focusing action of the pick-up lens 9 and the rotary action of the disk 1. Moreover, any decrease in signals due to the contact of the pick-up lens 9 with the respective brushing hair bundles 3 is within a correctable range and the disk 1 continues to rotate.

Therefore, according to the present invention, the wrong action of the CD player due to the interference contact of the cleaning members 2 with the pick-up lens 9 can be prevented and simultaneously the damage of the coating layer on the surface of the lens due to the excessive frictional contact can be prevented, whereby the pick-up lens 9 can be cleaned with certainty.

In particular, since the cleaning members 2 comprise the brushing hair bundles 3 diffused and finely divided on the disk 1 and the interval E between the adjacent brushing hair bundles 3 in the circumferential direction is set at or above the dimension of the diameter D of the pick-up lens 9, a number of the brushing hair bundles 3 brought into contact with the pick-up lens 9 can always be limited to one. Accordingly, the operating resistance and the frictional force which the pick-up system receives from the cleaning members 2 can be sufficiently reduced, whereby the pick-up lens 9 can be cleaned with certainty even though the torque of rotation of the disk 1 is very small.

Since the interval G between the brushing hair bundle 3a positioned on the innermost side on the disk 1 and the brushing hair bundle 3b positioned on the outermost side of the disk 1 is set at or above the dimension of the diameter D of the pick-up lens 9, the pick-up lens 9 is trackingly moved by the quantity of the dislocation between the adjacent brushing hair bundles 3 in the radial direction, whereby the brushing hair bundles 3 can clean the entire surface of the lens and the cleaning can be efficiently and quickly conducted.

Furthermore, since the base end portions 7 of the respective brushing hair bundles 3 are inserted through the holes 5 formed in the disk 1 to be bent around the circumferential edge portions of the through holes 5 and fixedly adhered to the disk 1 by the tape 8, the respective brushing hair bundles 3 can be easily planted or anchored at the correct position on the disk 1 and thus an improvement in productivity can be expected.

Figure 5:
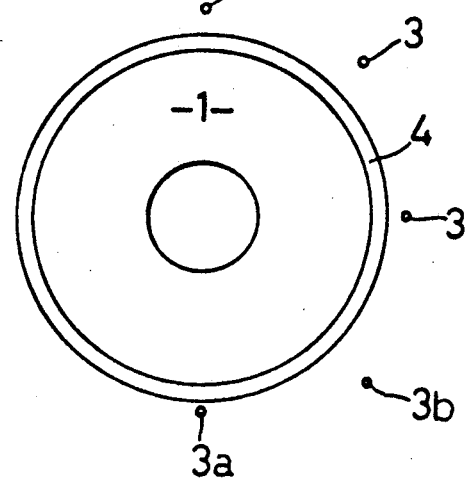
FIGS. 5 to 7 are plan views showing principal parts of lens cleaners according to other presently preferred embodiments of the present invention with details similar to FIG. 1 eliminated for sake of clarity.
Figure 6:
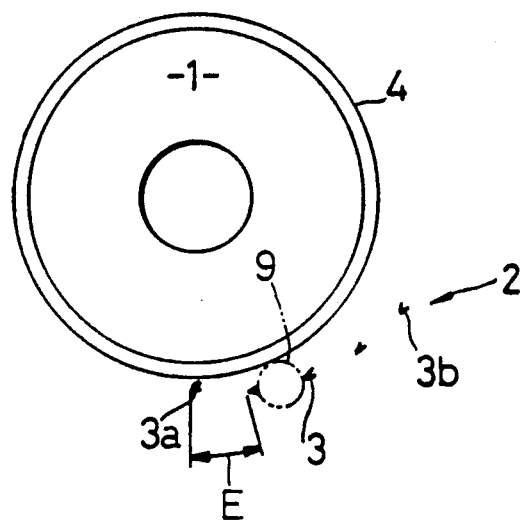
Figure 7:
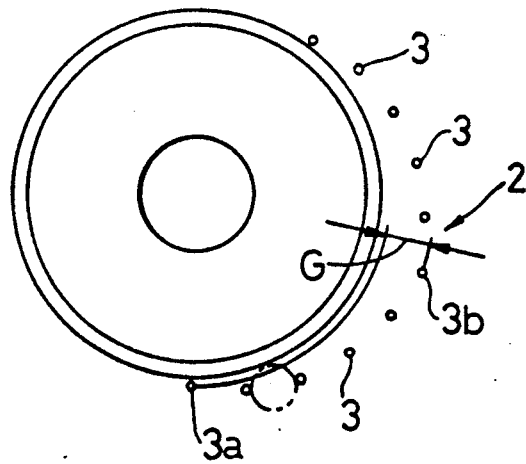

The arrangement of the brushing hair bundles 3 can be changed as shown in the embodiments of FIGS. 5 to 7.

In FIG. 5, the five brushing hair bundles 3 are arranged so as to shift inwardly and outwardly alternatively in the radial direction. In FIG. 6, the brushing hair bundles 3 have a V- or mountain-like shape and are arranged relatively close to each other so that the interval E between the adjacent brushing hair bundles 3 in the circumferential direction may be almost equal to the diameter D of the pick-up lens 9.

In the embodiment shown in FIG. 7, the brushing hair bundles 3 are arranged so that there is substantially no interval between the adjacent brushing hair bundles 3 in the radial direction, and the interval G between the brushing hair bundle 3a positioned on the innermost side and the brushing hair bundle 3b positioned on the outermost side in the radial direction can be at least the dimension of the diameter D of the pick-up lens 9. In this embodiment the number of brushing hair bundles 3 can be increased.

The brushing hair bundles 3 may be planted or anchored on the disk 1 by adhesion and by welding in lieu of the tape 8. In the case where the disk 1 is composed of two members divided in the thickness direction, the bent portion 7 of the brushing hair bundle 3 may be fixed between the two members.

Although the diameter of the disk 1 was selected at 12 cm in the above described preferred embodiments, it may also be 8 cm for a small compact disk. The shape of the brushing hair bundle 3 as seen in the plan views may also be changed to other ones such as C-shape or a straight line shape.

While I have shown and described several embodiments in accordance with the present invention, it should be understood that the invention is susceptible to some changes and modifications without departing from the scope of the invention. Therefore, I do not intend to be limited to details shown in the drawings and described above, but rather I intend to encompass all changes and modifications falling within the scope of the appended claims.

I claim:

1. A lens cleaner for a CD player with a pick-up lens, comprising a disk, a cleaning device provided on the disk, said cleaning device comprises brushing hair bundles, said brushing hair bundles being operatively arranged at a circumferential area of the disk radially outwardly of a lead-in area on the disk in a predetermined spiral dispersal pattern in the circumferential direction of at least about 180° and along different radial directions of the disk, with an interval between adjacent brushing hair bundles in the circumferential direction being at least equal to a diameter of a pick-up lens and with an interval between one of the brushing hair bundles positioned on the innermost side of the disk and another of the brushing hair bundles positioned on the outermost side of the disk in the radial direction being set at least equal to the diameter of the pick-up lens.

2. The lens cleaner as set forth in claim 1, wherein the disk is provided with through-holes, with the brushing hair bundles being operatively arranged on the surface thereof, wherein the brushing hair bundles have base end portions inserted through ones of respective through-holes from one side of the disk to another side of the disk and are bent around circumferential edge portions of said through-holes, and said bent base end portions of the respective brushing hair bundles are fixed at another side of the disk.

3. The lens cleaner as set forth in claim 1, wherein the bundles comprise a plurality of ultrafine brushing hairs.

4. The lens cleaner as set forth in claim 1, wherein the bundles have a V-shape.

5. The lens cleaner as set forth in claim 1, wherein the bundles have a C-shape.

6. The lens cleaner as set forth in claim 1, wherein the bundles have a straight-line shape.

7. The lens cleaner as set forth in claim 1, wherein the lead-in area is arranged on a signal-recording side of the disk.

8. The lens cleaner as set forth in claim 1, wherein the predetermined dispersal pattern shifts inwardly and outwardly alternatively.

9. The lens cleaner as set forth in claim 1, wherein the predetermined dispersal pattern is such that the bundles are relatively close to each other and the interval between adjacent bundles is approximately equal to the diameter of the pick-up lens.

10. The lens cleaner as set forth in claim 1, wherein the predetermined dispersal pattern provides substantially no interval between adjacent bundles in the radial direction and an interval between the bundle positioned most proximate the lead-in area and the bundle positioned most remote from the lead-in area in the radial direction of an amount at least equal to the diameter of the pick-up lens.

* * * * *